Figure 1:
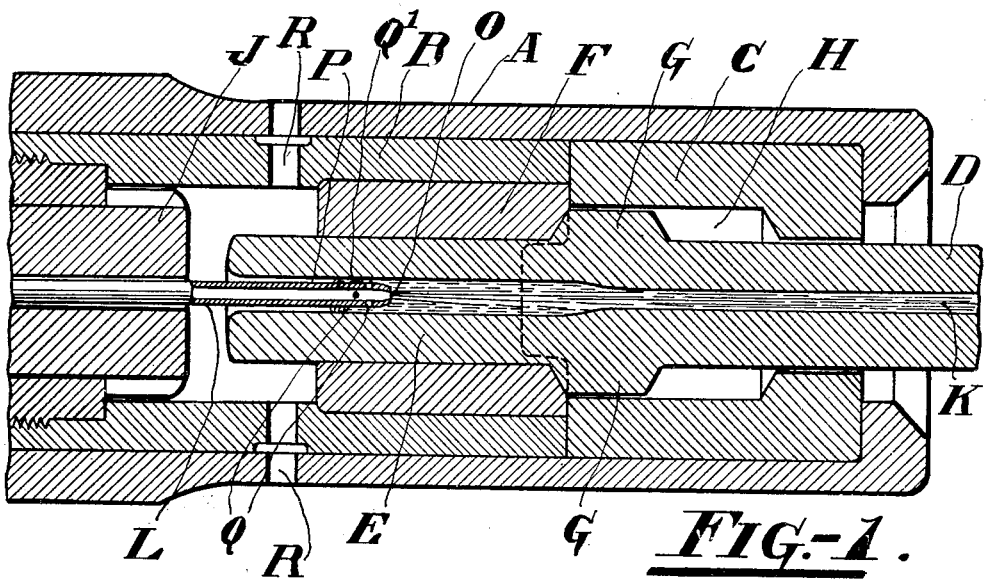

Dec. 10, 1929.   L. C. BAYLES   1,739,117
WATER TUBE FOR ROCK DRILLS
Filed Sept. 22, 1928

INVENTOR.
Lewis C. Bayles
BY
HIS ATTORNEY

Patented Dec. 10, 1929

1,739,117

UNITED STATES PATENT OFFICE

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY

WATER TUBE FOR ROCK DRILLS

Application filed September 22, 1928. Serial No. 307,622.

This invention relates to rock drills, but more particularly to a water tube for rock drills of the type in which cleansing liquid is conveyed through the rock drill and the drill steel for washing the cuttings from the drill hole.

It is an object of the invention to preclude the entrainment of air through the cleansing medium introduced into the drill hole.

Other objects will be in part obvious and in part pointed out hereinafter.

Figure 3:
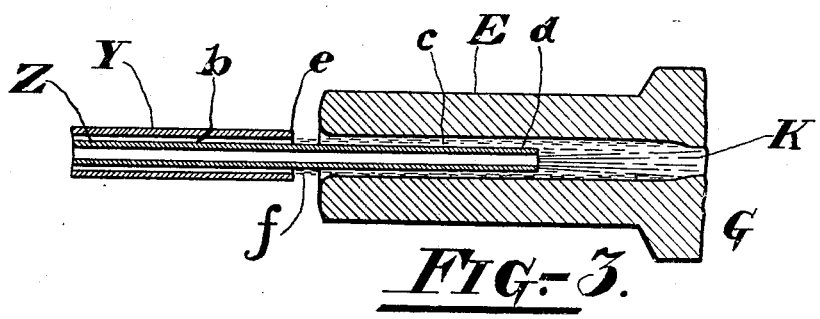
Figure 2:
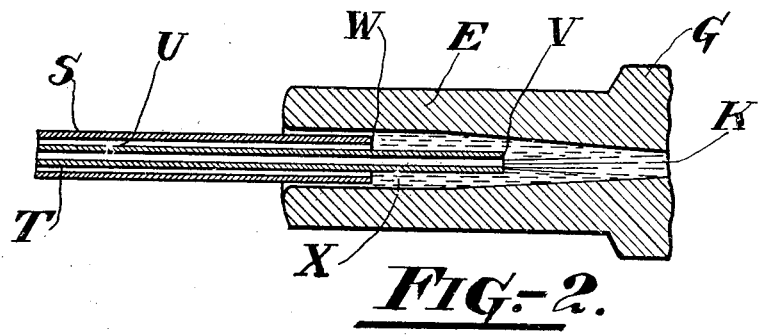

In the drawings illustrating the invention and a practical application thereof,

Figure 1 is a longitudinal sectional elevation of the front end of a rock drill having the invention applied thereto, Figure 2 is a longitudinal sectional elevation illustrating a modification of the invention, and Figure 3 is a similar view showing another modified form of the invention.

Referring to the drawings, and at first more particularly to the modification illustrated in Figure 1, A represents the front head of a drill in which is disposed chuck mechanism comprising in this instance a chuck B which may be interlocked in a well known manner to a chuck jaw C disposed in the front end of the front head A.

A drill steel D extends into the chuck jaw C and is guided at its rearward or shank end E by a chuck bushing F disposed in the front end of the chuck B. The drill steel D illustrated is of a well known type having lugs G to interlock with key portions H of the chuck jaw C for transmitting rotary movement of the chuck jaw C to the drill steel D. The drill steel D extends with its shank E rearwardly of the chuck bushing F to receive the blows of a hammer piston, only the extension J of which is shown, and said drill steel D is provided with the usual longitudinal passage K for conveying cleansing liquid, such as water, into the hole being drilled.

One method frequently employed for introducing cleansing liquid into the drill steel is to equip the rock drill with a tube which may be fastened to the rearward end of the rock drill and is of a length to extend through the hammer piston and into the passage K of the drill steel D. The water supplied to the drill steel D is of course under considerable pressure so that an efficient cleansing effect may be obtained in the drill hole. Owing to the constant reciprocation of the drill steel D in its holder, such as the chuck mechanism, and to the terrific vibration set up in the drill during the operation of the drill, it has been found impractical to employ a contact fit between that portion of the water tube and the passage K of the drill steel into which the tube extends. In cases where these elements have been constructed to insure body contact between them, it has been found that the wearing action of the drill steel on the tube results in a short period of usefulness of the tube. On the other hand, when sufficient clearance is allowed between the tube and the drill steel to prevent contact between these elements, the water issuing from the tube into the drill steel under high velocity creates an injector effect and causes a considerable volume of air, either atmospheric, in case the chuck mechanism is vented, or such pressure fluid as may leak past the piston into the chuck mechanism to be drawn into the drill hole by the water flowing through the drill steel.

The quantity of air entrained by the water is frequently of considerable magnitude and upon entering into the drill hole escapes therefrom in the form of bubbles carrying with it dust in a dry state which is discharged into the atmosphere. This, in some localities, is considered extremely undesirable, particularly where the dust, when inhaled, is injurious to the health of the attendants. Various expedients have heretofore been resorted to for preventing the drawing of an undue amount of air through the drill steel into the drill hole. For instance, it has been suggested that this objectionable condition may be ameliorated by lowering the pressure of the cleansing liquid and consequently reducing the velocity thereof through the drill steel. Although this method to some extent reduces the volume of air which is drawn into the drill hole, it obviously has its limitations and is therefore not applicable to all conditions of drilling, particularly in uphole drilling or in drilling down holes of considerable depth where velocity of the water is essential for removing the detritus from the drill hole.

In order to overcome the objectionable conditions hereinbefore described, it is contemplated to equip the rock drill with a water tube designated by L. The water tube L may be secured in the drill in any well known manner and may be in communication with a source of water supply under pressure at the point at which it is secured as is the usual practice. The tube L may be of substantially uniform diameter throughout its length and in this instance the outlet opening O of the nozzle P of the tube L is somewhat restricted to accelerate the velocity of the water issuing therefrom into the passage K.

With the clearance between the drill steel E and the nozzle P which is essential for the proper protection of the water tube against wear which might otherwise be caused by the action of the drill steel, there is of course sufficient space between these elements to permit the drawing of air from the interior of the chuck mechanism into the passage K by the water issuing from the outlet opening of the nozzle. In order to prevent the drawing of air into the drill steel in the manner described, the nozzle P is provided with apertures or ports Q preferably located at the point at which the restricted portion of the nozzle tapers from the main portion of the nozzle.

The ports Q may be of any suitable number and in order to obtain the best results each port is preferably of such cross sectional area that the combined areas of the ports is of considerably less extent than the cross sectional area of the outlet opening O of the nozzle. In this way only a comparatively small amount of water issues in a radial direction from the ports Q and, in consequence, the velocity of the water issuing from these ports will also be considerably lower than that issuing from the outlet opening O. The water flowing from the ports Q forms an annulus or envelope Q' around the nozzle and will of course fill up the space between the nozzle and the drill steel. In this way the water flowing at high velocity from the outlet opening O of the nozzle will be insulated from the air at the rearward end of the passage and the air will be precluded from the passage K. Although the annulus of water around the nozzle will intermingle with that flowing at high velocity, the velocity of the annulus of water is very much lower and the injector effect of the water flowing from the outlet opening O will therefore only act on the water surrounding the nozzle but this injector effect will not be transmitted through the annulus of water to draw air therethrough.

The tendency of the water issuing from the ports Q is to flow both in forwardly and rearwardly directions. In the absence of a stream of water under high velocity from the outlet opening O, the water issuing from the ports Q would of course flow rearwardly into the chuck mechanism, particularly when the drill is used in positions closely approaching the horizontal. However, when operating under the conditions heretofore described, the suction created by the water flowing from the end of the nozzle will be sufficient to prevent any water flowing through the ports Q from passing rearwardly through the passage K into the chuck mechanism.

In certain positions of the drill, that is, in positions above the horizontal, any water remaining in the passage K after the drill has been stopped will of course drain rearwardly into the chuck mechanism, and in order to provide an outlet for such water from the chuck mechanism, the chuck B and the front head A may be provided with vents R through which such water may escape to the exterior of the drill. These vents R will also serve as an avenue of escape for any pressure fluid which may leak from the percussive element of the drill into the interior of the chuck and which pressure fluid in the absence of the vents R or their equivalent, would flow through the drill steel into the drill hole and bring about the objectionable condition which the present invention contemplates eliminating.

In the modified form of the invention illustrated in Figure 2, two water tubes are employed for obtaining the objects sought. These water tubes are designated by S and T. The tubes are concentrically arranged with respect to each other, the tube S being the outer tube and the tube T the inner tube. The inner tube T is of sufficiently smaller diameter than the bore of the tube S to form an annular space or passage U around the inner tube through which water may flow into the drill steel.

In this instance both tubes extend into the passage K. The tube T is preferably of greater length than the tube S so that the nozzle V of the tube T projects a somewhat greater distance into the passage K than does the nozzle W of the tube S. In this form of construction and method of arrangement of the tubes, the tube T serves to convey water under high velocity into the drill hole to produce the desired cleansing effect in the drill hole, and the water tube S conveys water under relatively low velocity into the rearward end of the passage K to form an annulus X of water around the nozzle V.

The water issuing from the nozzle W flowing at a very much slower speed than that issuing from the nozzle V will exclude the air around the nozzle V and thus prevent the sucking of air into the drill steel. The annular space or passage U around the tube T has of course been considerably exaggerated for the sake of clearness of illustration, but it is to be understood that this space may be suitably restricted so as to deliver water into the passage K and around the nozzle V in a quantity suitable to insure the results sought. Other well known means may however be employed for maintaining the pressures which it is desired to maintain in the several tubes.

The modification illustrated in Figure 3 also contemplates the use of a plurality of tubes. These tubes are denoted by Y and Z. The tubes Y and Z are concentrically arranged with respect to each other, the tube Z being the inner tube through which water under high velocity is intended to flow into the drill steel and the tube Y is the outer tube spaced from the inner tube to form an annular passage $b$ therebetween. The annular passage $b$ serves to convey water under low velocity into the passage K to form an annulus $c$ of sealing water around the nozzle $d$ of the tube Z.

In this modification only the inner tube Z projects into the drill steel D and the front end or nozzle $e$ of the tube Y terminates at a point slightly rearwardly of the rearward end of the passage K so that the water issuing from the said nozzle $e$ is projected across a space $f$ between the nozzle $e$ and the rearward end of the drill steel and into the passage K. The water forming the annulus $c$ flows relatively slowly along the nozzle $d$ and intermingles with the water issuing from the nozzle $d$ at a point forwardly of said nozzle.

I claim:

1. In a rock drill, the combination of a holder and a drill steel extending into the holder, said drill steel having a passage, a water tube in the drill having a nozzle for introducing water into the passage, and means for forming an envelope of water around the nozzle to prevent air from being drawn into the passage.

2. In a rock drill, the combination of a holder and a drill steel extending into the holder, said drill steel having a passage, a water tube in the drill having a nozzle extending into the passage for introducing water under pressure into the passage, and means for forming an envelope of water around the nozzle to prevent the entrance of air into the passage.

3. In a rock drill, the combination of a holder and a drill steel extending into the holder, said drill steel having a passage, a water tube in the drill having a nozzle extending into the passage for introducing water under pressure into the passage, and means for forming an envelope of water under relatively low pressure around the nozzle to prevent the drawing of air into the passage by the water issuing from the outlet opening of the nozzle.

4. In a rock drill, the combination of a holder and a drill steel extending into the holder, said drill steel having a passage for conveying water through the drill steel, a water tube in the rock drill having a nozzle extending into the passage for introducing water under pressure thereto, said nozzle having a restricted outlet opening, and apertures in the tube rearwardly of the outlet opening conveying a restricted flow of water into the passage, thus forming an annulus of water of relatively low velocity in the passage to prevent air from being drawn into the passage by the water issuing from the outlet opening of the nozzle.

In testimony whereof I have signed this specification.

LEWIS C. BAYLES.